United States Patent Office

3,296,175
Patented Jan. 3, 1967

3,296,175
POLYMER LATICES WHICH HAVE HIGH VISCOSITIES AND COATING COMPOSITION CONTAINING THE SAME
Joel Fantl, Frank J. Hahn, and John F. Heaps, Springfield, and Charles R. Williams, Longmeadow, Mass., assignors to Monsanto Company, St. Louis, Mo., a corporation of Delaware
No Drawing. Filed Sept. 24, 1964, Ser. No. 399,061
10 Claims. (Cl. 260—29.6)

This invention relates to novel polymer latexes and to coating compositions containing the same.

This application is a continuation-in-part of copending application Serial No. 161,301, filed December 21, 1961, now abandoned.

The use of polymer latexes such as latexes of styrene-butadiene copolymers, polyvinyl acetate, acrylate ester polymers and the like in the manufacture of water-based coating compositions is well-known in the art. The common method of applying such coating compositions, e.g., by brushing or rolling, requires that the coating compositions have a sufficiently high viscosity to enable its convenient transfer from the container to the surface being painted. To attain the desired viscosity, thickening agents such as cellulose ethers and water-soluble gums are customarily added to the coating compositions. It is recognized in the art that the use of such thickening agents is not desirable, but to date their use has been a practical necessity to obtain desired viscosities. In particular, the more effective thickening agents customarily employed cause flocculation of the dispersed polymer and depend upon flocculation to increase the viscosity. As a result, the paint exhibits rheology conducive to easy application, but sacrifices package homogeneity, leveling, gloss, bonding to chalked paint surfaces, exterior durability and film-thickness. Avoidance of flocculation is essential to obtain latex paints which will deposit glossy films. In view of the foregoing, it obviously would be desirable to have available to the art polymer latexes which either have high viscosities as prepared or whose viscosities can be increased significantly without adding thickeners thereto.

It is an object of this invention to provide polymer latexes which have high viscosities.

Another object of this invention is to provide viscous water-based coating compositions which contain a polymer latex as at least the principal film-forming component and which coating compositions do not require the use of thickening agents which flocculate the dispersed polymers.

Other objects and advantages of the invention will be apparent from the following detailed description thereof.

The above and related objects are attained by polymerizing particular monomer mixtures by particular emulsion polymerization techniques. Specifically, monomer mixtures containing a polymerizable acid, e.g., acrylic acid, and the balance of one or more vinylidene monomers interpolymerizable with the acid, are polymerized by conventional emulsion polymerization techniques except that the addition of the acid monomer to the polymerization reaction is delayed until at least about 70% by weight of the total monomer mixture has been polymerized. The resulting latexes, when adjusted to a pH of about 8–12, increase significantly in viscosity and films laid down therefrom are clear and glossy. When the latexes are formulated with suitable pigments and rendered alkaline, coating compositions of brushable and rollable consistency are obtained. The films laid down from such coating compositions can be either flat or moderately glossy, depending upon the type and amount of pigments incorporated therein.

The following examples are set forth to illustrate more clearly the principle and practice of this invention to those skilled in the art. Unless otherwise noted, where parts or quantities are mentioned, they are parts or quantities by weight.

EXAMPLE I

Part A

An approximately 45% solids latex of an interpolymer of 48.5% styrene, 39% 2-methyl hexyl acrylate, 6% acrylonitrile and 6.5% methacrylic acid is prepared by a modification of the process described in Example I of U.S. 2,767,153. The following solutions are prepared.

KETTLE CHARGE

| Component: | Parts |
|---|---|
| Water (distilled) | 402 |
| Triton X–100 [1] | 1.7 |
| Triton X–770 [2] | 1.2 |
| Tetrasodium pyrophosphate | 0.2 |

[1] An ethylene oxide condensate of nonylphenol.
[2] Sodium salt of an alkyl aryl polyether sulfate.

CATALYST AND EMULSIFIER PREMIX

| Component: | Parts |
|---|---|
| Water (distilled) | 132 |
| Triton X–100 | 0.5 |
| Triton X–770 | 10.7 |
| Potassium persulfate | 2.7 |

MONOMER CHARGE I

| Component: | |
|---|---|
| Acrylonitrile | 24 |
| Styrene | 56 |

MONOMER CHARGE II

| Component: | |
|---|---|
| Styrene | 138 |
| 2-ethylhexyl acrylate | 125 |

MONOMER CHARGE III

| Component: | |
|---|---|
| 2-ethylhexyl acrylate | 31 |
| Methacrylic acid | 26 |

The kettle charge is added to a glass-lined reaction vessel that is fitted with a reflux condenser and a stirrer and refluxed (at atmospheric pressure) for 15 minutes to deoxygenate the solution. There is then added to the reaction vessel 10 parts of the catalyst and emulsifier premix. The balance of the catalyst and emulsifier premix is added to the reaction vessel at a uniform rate of 1.3 parts per minute, the total time of addition being 100 minutes. As soon as the initial aliquot of the catalyst and emulsifier premix are added to the reaction vessel, Monomer Charge I is added to the reaction vessel at a uniform rate of 2 parts per minute, the time of addition for this monomer charge being about 30 minutes. Immediately thereafter, Monomer Charge II is added to the reaction vessel at a uniform rate of 5.5 parts per minute, the total time of addition of this monomer charge being about 50 minutes. Immediately thereafter, Monomer Charge III is added to the reaction vessel at a uniform rate of 5 parts per minute, the addition of Monomer Charge III requiring approximately 10 minutes. Reflux is continued for an additional 15 minutes to polymerize the final traces of monomers. Reflux is then continued for an additional 15 minutes and 60 parts of distillate are removed so as to remove by steam distillation any residual monomers present in the latex. The resulting latex is subsequently identified as Latex A.

The catalyst concentration and monomer addition times described in the paragraph above are selected so that the monomers polymerize at substantially the rate they are added to the reaction vessel. It will be specifically noted that the acid monomer, i.e., methacrylic acid, is not introduced into the polymerization reaction until approximately 85% of the total monomer charge has been polymerized. The amount of acid employed is about 45.5% of Monomer Charge III.

*Part B*

Part A is repeated except that Monomer Charge II and Monomer Charge III are combined to form a single monomer charge. It will be noted that in this polymerization the introduction of the methacrylic acid into the polymerization reaction is begun when only 20% of the total monomer charge has been polymerized. This latex is subsequently identified as Control Latex A.

*Part C*

Part A above is repeated except that the following monomer charges are employed in place of Monomer Charges I, II and III of Part A above.

MONOMER CHARGE I

| Component: | Parts |
|---|---|
| Acrylonitrile | 6 |
| Styrene | 14 |

MONOMER CHARGE II

| Component: | |
|---|---|
| Styrene | 26 |
| 2-ethylhexyl acrylate | 24 |

MONOMER CHARGE III

| Component: | |
|---|---|
| 2-ethylhexyl acrylate | 24.5 |
| Methacrylic acid | 5.5 |

It will be specifically noted that the acid monomer, i.e., methacrylic acid, is not introduced into the polymerization reaction until 70% of the total monomer charge has been polymerized. It is further noted that the acid monomer constitutes 5.5% of the total monomer charge and about 18.3% of Monomer Charge III.

The resulting latex is subsequently identified as Latex A-1.

*Part D*

Part C above is repeated except that the following monomer charge is employed in place of Monomer Charge III in Part C above:

MONOMER CHARGE III

| Component: | Parts |
|---|---|
| 2-ethylhexyl acrylate | 25.5 |
| Methacrylic acid | 4.5 |

It will be specifically noted that the acid monomer, i.e., methacrylic acid is not introduced into the polymerization reaction until 70% of the total monomer charge has been polymerized. The acid monomer constitutes 4.5% of the total monomer charge and about 15% of Monomer Charge III.

The resulting latex is subsequently identified as Control Latex A-1.

*Part E*

Latex A (from Part A), Control Latex A (from Part B), Latex A-1 (from Part C) and Control Latex A-1 (from Part D) are diluted to 28% solids and adjusted to a pH of 9.5 with 28% ammonium hydroxide. After standing for 1 hour, Latex A and Latex A-1 both have a viscosity of over 2400 cps., whereas Control Latex A and Control Latex A-1 have viscosities of less than 200 cps. This data clearly and unequivocally establish that the method of polymerization has a striking and unexpected effect upon the viscosity of the latex.

EXAMPLE II

*Part A*

A low gloss latex paint suitable for either exterior or interior use is prepared by adding 18 lbs. of water and 42 lbs. of Latex A (from Example I, Part A), to a pigment base prepared from 25 lbs. of rutile titanium dioxide, 6 lbs. of china clay, 10 lbs. of magnesium silicate, 0.2 lb. of tetra potassium pyrophosphate, 0.4 lb. of dispersant (Tamol 731 at 25% solids) and 11 lbs. of water. The latex paint is adjusted to a pH of 9.5 with ammonium hydroxide to provide a coating composition having a viscosity of about 80 Kreb units. The coating composition exhibits no stratification after prolonged storage and requires no stirring prior to use. This latex paint is subsequently identified as Coating Composition A.

*Part B*

A latex paint identical with that described in Part A above is prepared except that Latex A is replaced with Control Latex A (from Example I, Part B). This latex paint has a viscosity of less than 60 Kreb units and is too thin to apply by brushing or rolling.

*Part C*

The latex paint from Part B above is thickened to a viscosity of 80 Kreb units by adding thereto about 0.8 lb. of methyl cellulose (technical grade, 400 cps.). This latex paint is subsequently identified as Control Coating Composition A.

*Part D*

Coating Composition A (from Part A above), as compared with Control Coating Composition A (from Part C above), has superior leveling, superior ability to bond to chalked paint surfaces, a reduced tendency to foam, and higher gloss.

EXAMPLE III

A semigloss latex paint suitable for interior use is prepared by dispersing 25 lbs. of rutile titanium dioxide and 0.1 lb. of tetra potassium pyrophosphate in 15 lbs. of water in a Cowles mixer and adding thereto 57 lbs. of Latex A (from Example I, Part A) and 3 lbs. of a dispersant Igepal C0880 (33% solids). The pH of the resulting paint is adjusted to 9.5 with ammonium hydroxide to obtain a coating composition having a viscosity of approximately 75 Kreb units.

EXAMPLE IV

A mixture of 25 lbs. of rutile titanium dioxide, 8 lbs. of an ester formed between 41 parts of soya fatty acids and 59 parts of a styrene-allyl alcohol interpolymer and 2.8 lbs. of soya fatty acids are ground together on a 3-roll paint mill. To this pigment paste is first added 0.87 lb. of morpholine and then 16 lbs. of water are added with stirring to give a smooth base. To this paste are then added 23 lbs. of a latex prepared by the process of Example I of U.S. 2,767,153 and 23 lbs. of Latex A (from Example I, Part A). Finally there is added 0.1 lb. of Cobalt Cyclodex (as a drier) and the pH is adjusted to 9 with 28% ammonium hydroxide. The coating composition is of brushable consistency and will dry to provide a glossy film.

EXAMPLE V

*Part A*

A 46% solids latex of an interpolymer of 35% butadiene, 60% styrene and 5% acrylic acid is prepared from the polymerization receipe set forth below:

| Component: | Parts |
|---|---|
| Water (distilled) | 120 |
| Butadiene | 35 |
| Styrene | 60 |
| Acrylic acid | 5 |
| Sodium stearate | 5 |
| Potassium persulfate | 2 |
| t-Dodecyl mercaptan | 0.2 |

The water and soap are charged to an autoclave and the resulting solution is boiled for 5 minutes to deoxygenate the water. Thereafter, all the remaining components of the polymerization recipe except for 10 parts of styrene monomer and 5 parts of acrylic acid are charged to the autoclave which is then sealed. The reaction mixture is heated to 50° C. and stirred until essentially all of the initially charged monomers have polymerized. Thereafter, the remaining styrene monomer and acrylic acid monomer are slowly charged to the reaction vessel with stirring. The acid monomer constitutes 33⅓% of the remaining monomer mixture added to the reaction vessel. The temperature is maintained at 50° C. until all of the monomers have polymerized. This latex is subsequently identified as Latex B.

Part B

Part A is repeated except that all of the monomer components are charged to the polymerization reaction at the same time. This latex is subsequently identified as Control Latex B.

Part C

Latex B and Control Latex B are both diluted to 28% solids and adjusted to a pH of 9.5 with 28% ammonium hydroxide. Latex B, after standing for one hour, has a viscosity of over 2000 cps., whereas Control Latex B has a viscosity of less than 150 cps.

EXAMPLE VI

Part A

A 46% solids latex of an interpolymer of 60% ethyl acrylate, 32% methyl methacrylate and 8% methacrylic acid is prepared employing the polymerization system set forth below:

| Component: | Parts |
| --- | --- |
| Water (distilled) | 120 |
| Ethyl acrylate | 60 |
| Methyl methacrylate | 32 |
| Methacrylic acid | 8 |
| Sodium stearate | 5 |
| Potassium persulfate | 1 |

The soap solution is prepared and boiled for 10 minutes to remove oxygen and then the remaining components of the recipe are charged except for 12 parts of ethyl acrylate and 8 parts of methacrylic acid. The reaction mixture is heated to reflux and agitated until all of the initial monomer charge has polymerized. Thereafter, the remaining 12 parts of ethyl acrylate and 8 parts acrylic acid, which acrylic acid constitutes 40% thereof, are slowly chraged to the reaction mixture with agitation while maintaining reflux until all of the monomers have polymerized. This latex is subsequently identified as Latex C.

Part B

Part A is repeated except that the total monomer charge is initially added to the polymerization reaction. This latex is subsequently identified as Control Latex C.

Part C

Latex C and Control Latex C are both diluted to 28% solids and adjusted to a pH of 9.5 with 28% ammonium hydroxide. Latex C, after standing for one hour, has a viscosity of over 3000 cps., whereas Control Latex C has a viscosity of less than 800 cps.

EXAMPLE VII

Part A

An approximately 46% solids latex of an interpolymer of 94% vinyl acetate and 6% crotonic acid is prepared employing the polymerization recipe below:

| Component: | Parts |
| --- | --- |
| Water (distilled) | 120 |
| Vinyl acetate | 94 |
| Crotonic acid | 6 |
| Sodium lauryl sulfate | 3 |
| Cumene hydroperoxide | 0.5 |

The surfactant solution is prepared as described in the preceding examples and thereafter all of the remaining components of the polymerization system are charged except for 9 parts of vinyl acetate and 6 parts of crotonic acid. The polymerization mixture is heated to 50° C. and agitated until all of the initially charged monomers are polymerized. Thereafter, the remaining 9 parts of vinyl acetate and 6 parts of crotonic acid are charged to the polymerization which is then carried to completion. It is specifically noted that the crotonic acid constitutes 40% of the remaining monomer charge. This latex is subsequently identified as Latex D.

Part B

Part A above is repeated except that the total monomer charged is initially added to the polymerization reaction. This latex is subsequently identified as Control Latex D.

Part C

Latex D and Control Latex D are both diluted to 28% solids and adjusted to a pH of 9.5 with 28% ammonium hydroxide. Latex D, after standing for one hour, has a viscosity of over 2000 cps., whereas Control Latex D has a viscosity of less than 1000 cps.

EXAMPLE VIII

A series of coating compositions identical to Coating Composition A (see Example II) are prepared except that Latex A is replaced with, respectively, Latex B, Latex C and Latex D. Each of the compositions has a brushable viscosity and gives good coverage when applied to plaster walls by brush or roller.

The polymerizable monomers employed in preparing the latexes of the invention contain an alpha,beta-ethylenically unsaturated acid monomer and at least 1 vinylidene monomer interpolymerizable with the acid monomer. The critical feature of this invention is that the addition of the acid monomer to the emulsion polymerization process is delayed until at least 70% by weight of the monomers have polymerized. The amount of the acid monomer employed is such as to constitute 18–75% by weight of the remaining monomer mixture added to the emulsion. Preferably, the acid monomer constitutes 5.5–20% and more particularly 8–15% by weight of the total monomers. Stated in terms of the weight of the remaining monomer mixture added to the polymerization reaction, preferably the acid monomer constitutes about 20–65 weight percent and more particularly about 25–50 weight percent of the remaining monomer mixture.

The acid monomers employed contain alpha,beta-ethylenic unsaturation and preferably a single carboxyl group. Typical examples of such preferred acid monomers are acrylic acid, methacrylic acid, crotonic acid, etc. Other acid monomers which can be employed include maleic acid, itaconic acid, and half esters of maleic acid and fumaric acid such as monomethyl maleate, monobutyl maleate, monododecyl maleate, monobutyl fumarate, etc.

The vinylidene monomers that are interpolymerized with the acid monomer can be any vinylidene monomer interpolymerizable therewith such as mono- and di-olefins, e.g., ethylene, propylene, isobutylene, butadiene, isoprene, etc.; vinyl halides, e.g., vinyl chloride, vinyl bromide, etc.; vinylidene halides, e.g., vinylidene chloride; esters of vinylidene monocarboxylic acids with 1–18 carbon atom monohydric alcohols, e.g., methyl acrylate, methyl alpha-chloroacrylate, butyl acrylate, benzyl acrylate, dodecyl acrylate, the corresponding esters of methacrylic acid, etc.; amides and nitriles of vinylidene monocarboxylic acids, e.g., acrylamide, methacrylamide, acrylonitrile, methacrylonitrile, etc.; vinylidene aromatic hydrocarbons and nuclear alkyl and halogen derivatives thereof, e.g., styrene, vinyl naphthalene, alphamethylstyrene, vinyl toluene, 2,4-dimethylstyrene, o-, m-, p-chlorostyrene, 2,5-dichlorostyrene, 2-methyl-4-chlorostyrene, etc.; vinyl esters of 1–18 carbon monocarboxylic acids such as vinyl acetate, vinyl stearate, and vinyl benzoate, etc. Diesters of maleic acid and fumaric acid with 1–18 carbon atom monohydric alcohols, while not vinylidene monomers in the strict sense of the word, can be used interchangeably therewith. Typical examples of such monomers are diethyl maleate, dibutyl fumarate, etc.

In the broadest aspect of the invention, the acid monomer can be polymerized with any vinylidene monomer or any mixture thereof as set forth in the paragraph above. Preferably, however, the latexes are prepared from monomer mixtures which will provide polymers having second order transition temperatures not higher than about 50° C. The selection of monomer mixtures meeting this requirement is well within the skills of the art. Typical monomer compositions which can be employed to prepare the latexes of the invention are set forth below:

(a) 80–95% methyl acrylate/5.5–20% acrylic and/or methacrylic acid, (b) 80–95% butyl acrylate/5.5–20% acrylic and/or methacrylic acid, (c) 25–65% styrene/3–10% acrylonitrile/35–60% 2-ethylhexyl acrylate/5.5–20% acrylic and/or methacrylic acid, (d) 25–60% styrene/3–10% acrylonitrile/35–60% dibutyl fumarate/5.5–20% acrylic and/or methacrylic acid, (e) 25–50% styrene/30–40% ethyl acrylate/5.5–20% acrylic and/or methacrylic acid, (f) 25–60% methyl methacrylate/3–10% acrylonitrile/35–60% 2-ethylhexyl acrylate/5.5–20% acrylic and/or methacrylic acid, (g) 80–95% vinyl acetate/5.5–20% acrylic and/or methacrylic acid, (h) 80–95% vinyl acetate/5.5–20% crotonic acid, (i) 20–95% butadiene/0–75% styrene/5.5–20% acrylic and/or methacrylic acid, (j) 20–95% butadiene/0–75% acrylonitrile/5.5–20% acrylic and/or methacrylic acid, (k) 20–95% butadiene/0–75% methyl methacrylate/5.5–20% acrylic and/or methacrylic acid, (l) 40–75% vinyl chloride/15–55% vinyl acetate/5.5–20% acrylic and/or methacrylic acid, (m) 40–75% vinyl chloride/15–55% ethyl acrylate/5.5–20% acrylic and/or methacrylic acid, (n) 40–75% vinyl chloride/15–55% dibutyl fumarate/5.5–20% acrylic and/or methacrylic acid.

Especially preferred interpolymer latexes are prepared from monomers consisting of (1) about 25–60 and preferably about 40–60% styrene and/or alpha-methylstyrene, (2) about 30–60 and preferably about 35–45% of an acrylate and/or methacrylate ester of a 5–18 carbon atom monohydric alcohol such as hexyl acrylate, dodecyl acrylate, etc. and/or a diester of maleic acid or fumaric acid with a 1–18 carbon atom monohydric alcohol such as diethyl maleate or dibutyl fumarate, (3) about 2–20 and preferably about 3–10% of acrylonitrile or methacrylonitrile, and (4) about 5.5–20 and preferably about 8–15% of acrylic acid or methacrylic acid.

The monomers employed herein can be polymerized by any of the known emulsion polymerization processes provided only that the addition of the acid monomer to the polymerization reaction is delayed until at least about 70% of the total monomer mixture has polymerized. Of necessity, the monomer mixture is charged to the polymerization reaction in two or more separate monomer charges. In the simplest embodiment of the invention, the vinylidene monomers which constitute 70–90% of the total monomers are emulsified in water containing a polymerization initiator and polymerized. The acid monomer, preferably in admixture with a small quantity of the vinylidene monomer, is then added to the polymerization medium and the polymerization is completed. In another embodiment of the invention the monomers are added continuously to the polymerization reaction at essentially the rate at which the added monomers will polymerize.

In preparing latexes from monomers of two or more vinylidene monomers, one of which normally gives polymers having a high second order transition temperature (e.g., styrene, acrylonitrile, or methyl methacrylate) and one of which normally gives polymers having a low second order transition temperature (e.g., an alkyl acrylate, a dialkyl maleate or a dialkyl fumarate), it is preferred to employ a special modification of the continuous monomer addition process. Specifically, the vinylidene monomer giving polymers of high second order transition temperature should be charged first, followed by the vinylidene monomer giving polymers of low second order transition temperature and finally by the acid monomer. Example I illustrates this embodiment of the invention. Pigmented coating compositions prepared from such latexes offer an optimum combination of ease of application, quick drying and film durability.

The emulsifying agents, polymerization initiators, polymerization modifiers, etc., that are employed in the polymerization process of the present invention are those commonly used in known prior art emulsion polymerization processes.

The latexes of the present invention differ from prior art latexes of polymers prepared from identical monomer mixtures primarily in developing unusually high viscosities at pH values in the range of 8–12 and preferably 8–10. The freeze-thaw stability of the latexes of the invention is also outstanding. Other properties of the latexes and the films prepared thereby are in general similar to those which would be predicted from the monomer composition of the interpolymer solids.

The latexes of the invention, particularly when adjusted to a pH of about 8–12 and preferably 8–10, have a much higher viscosity than conventional prior art latexes. The higher viscosities of these latexes makes them particularly suitable for coating and/or impregnating applications such as coating paper, impregnating glass fiber mats, etc.

In rendering the latexes alkaline to increase their viscosity, it is possible to use permanent alkalies such as sodium carbonate, sodium hydroxide, etc. Preferably, however, volatile nitrogenous bases should be used for this purpose. Examples of such bases include ammonia and amines having atmospheric boiling points not higher than about 175° C., e.g., mono-, di- and tri-methylamines, mono-, di- and tri-ethylamines, propylamine, ethanolamine, isopropanolamine, etc.

To prepare the protective coating compositions of the invention, the latexes of the invention will be adjusted to a pH of about 8–12 and will have dispersed therein pigments of the type customarily employed in the formulation of latex-based coating compositions. Typical examples of such pigments include clay, magnesium silicate, iron oxide, barium sulfate, titanium dioxide, phthalocyanine blue, etc. Carbonate pigments such as calcium carbonate can under some conditions of storage react with the carboxyl groups of the latex and, consequently, preferably should not be included in the coating compositions. The coating compositions of this invention, however, because of their high viscosity, do not require the addition of the customarily used thickeners such as cellulosic ethers, water-soluble gums, etc. By the proper selection of the type and quantity of pigments, it is possible to prepare coating compositions which dry to form flat, semiglossy and/or glossy films. Multicomponent coating compositions which contain a latex of this invention as one component dry to form exceptionally hard and durable films. Such compositions are disclosed and claimed in copending application Serial No. 166,368, filed January 15, 1962, now abandoned, and assigned to the assignee of the present application. If desired, the coating compositions of the invention can be formulated to include therein additional film-forming components such as conventional latexes, oil-modified alkyd resins, drying oils, etc.

The coating compositions of this invention can be applied by conventional techniques to protect metal, e.g., steel, copper and aluminum, plaster, wooden, plastic and like surfaces.

The above descriptions and particularly the examples are set forth for purposes of illustration only. Many variations and modifications thereof will be apparent to those skilled in the art and can be made without departing from the spirit and scope of the invention herein described.

What is claimed is:

1. In a process for preparing a polymer latex from polymerizable monomers which monomers contain from about 5.5–20% by weight of an alpha,beta-ethylenically unsaturated carboxylic acid and at least one vinylidene monomer which is interpolymerizable therewith, in which the monomers are emulsified in water and polymerized, the improvement which consists essentially of delaying the addition of the acid monomer to the emulsion until at least about 70% by weight of the monomers have polymerized; said acid monomer constituting 18–75% by weight of the remaining monomers added to the emulsion.

2. The process of claim 1 wherein the improvement consists essentially of delaying the addition of the acid monomer until 70–90% by weight of the monomers have polymerized.

3. The process of claim 1 wherein the acid monomer is selected from the group consisting of acrylic acid, methacrylic acid and mixtures thereof with the balance of the polymerizable monomer mixture being styrene and butadiene.

4. The process of claim 1 wherein the acid monomer is selected from the group consisting of acrylic acid, methacrylic acid and mixtures thereof with the balance of the polymerizable monomer mixture being styrene and ethyl acrylate.

5. The process of claim 1 wherein the acid monomer is crotonic acid.

6. The process of claim 1 in which the monomers consist of (1) about 25–60% by weight of a monomer of the group consisting of styrene and mixtures of styrene with alphamethylstyrene, (2) about 30–60% by weight of an ester formed between a 5–18 carbon monohydric alcohol and an acid of the group consisting of acrylic acid, methacrylic acid, and mixtures thereof, (3) about 2–20% by weight of a monomer of the group consisting of acrylonitrile, methacrylonitrile, and mixtures thereof, and (4) about 5.5–20% by weight of an acid of the group consisting of acrylic acid, methacrylic acid and mixtures thereof.

7. The process of claim 1 in which the monomers consist of (1) about 25–60% by weight of a monomer of the group consisting of styrene and mixtures of styrene with alphamethylstyrene, (2) about 30–60% by weight of a monomer of the group consisting of maleic acid diesters of 1–18 carbon atom monohydric alcohols, fumaric acid diesters of 1–18 carbon atom monohydric alcohols and mixtures thereof, (3) about 2–20% by weight of a monomer of the group consisting of acrylonitrile, methacrylonitrile, and mixtures thereof, and (4) about 5.5–20% by weight of an acid of the group consisting of acrylic acid, methacrylic acid and mixtures thereof.

8. A pigmented coating composition consisting essentially of a polymer latex prepared by the process of claim 1 and having intimately dispersed therein at least one pigment, the pH of the composition being in the range of about 8–12.

9. A pigmented coating composition consisting essentially of a polymer latex prepared by the process of claim 4 and having intimately dispersed therein at least one pigment, the pH of the composition being in the range of about 8–12.

10. A pigmented coating composition consisting essentially of a polymer latex prepared by the process of claim 6 and having intimately dispersed therein at least one pigment, the pH of the composition being in the range of about 8–12.

References Cited by the Examiner

UNITED STATES PATENTS

| | | | |
|---|---|---|---|
| 2,767,153 | 10/1956 | Sutton | 260—29.6 |
| 2,859,201 | 11/1958 | Uraneck et al. | 260—29.7 |
| 2,962,465 | 11/1960 | Lindstrom et al. | 260—29.6 |
| 3,073,791 | 1/1963 | Barkhuff | 260—29.6 |

FOREIGN PATENTS

| | | | |
|---|---|---|---|
| 233,298 | 3/1961 | Australia | 260—29.6 |

LEON J. BERCOVITZ, *Primary Examiner.*

DONALD E. CZAJA, *Examiner.*

R. W. GRIFFIN, *Assistant Examiner.*